United States Patent [19]
Fisher et al.

[11] Patent Number: 5,690,051
[45] Date of Patent: Nov. 25, 1997

[54] PET LITTER SEPARATION SYSTEM INCLUDING PULL-OUT COVER

[76] Inventors: Greg L. Fisher, P.O Box 434, West Linn, Oreg. 97068; Robert D. MacDonald, 147 5th St., Lake Oswego,, Oreg. 97034

[21] Appl. No.: 673,772

[22] Filed: Jun. 27, 1996

Related U.S. Application Data

[63] Continuation-in-part of Ser. No. 525,971, Sep. 7, 1995.

[51] Int. Cl.⁶ .................................................. A01K 1/035
[52] U.S. Cl. .................................................. 119/166
[58] Field of Search ................................. 119/166, 167

[56] References Cited

U.S. PATENT DOCUMENTS

| | | |
|---|---|---|
| 2,144,329 | 1/1939 | Conlon et al. . |
| 2,971,493 | 2/1961 | Robb . |
| 3,100,474 | 8/1963 | Schneider .......................... 119/166 |
| 3,141,441 | 7/1964 | Russell ............................. 119/166 |
| 3,332,397 | 7/1967 | Wall . |
| 3,339,527 | 9/1967 | Burroughs . |
| 3,476,083 | 11/1969 | Wall . |
| 4,190,525 | 2/1980 | Menzel ............................. 119/166 |
| 4,217,857 | 8/1980 | Geddie ............................ 119/166 |
| 4,325,325 | 4/1982 | Larter ............................... 119/116 |
| 4,325,822 | 4/1982 | Miller .............................. 119/166 |
| 4,326,481 | 4/1982 | Gruss ............................... 119/171 |
| 4,444,148 | 4/1984 | Lander ............................. 119/165 |
| 4,517,920 | 5/1985 | Yamamoto ....................... 119/166 |
| 4,615,300 | 10/1986 | McDonough .................... 119/167 |
| 4,649,578 | 3/1987 | Vargo .............................. 119/161 |
| 4,802,442 | 2/1989 | Wilson ............................. 119/166 |
| 4,817,560 | 4/1989 | Prince et al. ..................... 119/166 |
| 5,038,721 | 8/1991 | Ouellette et al. ................. 119/167 |
| 5,178,099 | 1/1993 | Lapps et al. ..................... 119/166 |
| 5,184,574 | 2/1993 | Kirk et al. ....................... 119/162 |
| 5,207,772 | 5/1993 | Lauretta et al. ................. 119/167 |
| 5,211,133 | 5/1993 | Foley .............................. 119/166 |
| 5,293,837 | 3/1994 | Caldwell .......................... 119/166 |
| 5,325,815 | 7/1994 | Gumpesberger ................. 119/166 |
| 5,372,095 | 12/1994 | Dowling et al. ................. 119/166 |
| 5,394,833 | 3/1995 | Glass ............................... 119/166 |
| 5,410,987 | 5/1995 | Simmons ......................... 119/166 |
| 5,454,349 | 10/1995 | Bondurant ....................... 119/166 |
| 5,551,376 | 9/1996 | Lundeen et al. ................. 119/167 |

FOREIGN PATENT DOCUMENTS

| | | |
|---|---|---|
| 1198638 | 12/1995 | Canada . |
| 2530923 | 7/1982 | France . |
| 8102536 | 5/1981 | Netherlands . |

*Primary Examiner*—Robert P. Swiatek
*Assistant Examiner*—Elizabeth Shaw
*Attorney, Agent, or Firm*—Chernoff, Vilhauer, McClung & Stenzel

[57] ABSTRACT

A pet litter separation system provides an open-centered separation device having an upper end forming a mouth, a lower end covered by a separation member, and a sidewall interconnecting the ends. The member forms openings suitably sized for permitting passage of reusable pet litter granules while blocking passage of clumped waste. The cover has a first portion positionable inside the device in overlying relationship to the member so that the granules and clumps are prevented from exiting through the member when the used litter in a conventional litter tray is poured into the device for processing. Preferably the tray is completely emptied for thorough cleaning. The cover further includes a mechanism for facilitating removal of the first portion out from beneath the granules and clumps so that the reusable granules can pass through the member preferably directly back into the tray for preventing material loss. The waste clumps are dumped back out the upper end of the device for disposal. In one preferred embodiment, the removal mechanism is a handle, and the cover is formed from a flat piece of flexible material, which flexibility enables the handle to be draped out-of-the-way during initial loading and enables the first portion to conform to the sidewall shape so as to facilitate cover removal when the device is nearly full. The first portion preferably passes over a spout on the device, thereby forming a channel for guiding waste products back into the device.

15 Claims, 6 Drawing Sheets

PET LITTER SEPARATION SYSTEM INCLUDING PULL-OUT COVER

CROSS-REFERENCE TO RELATED APPLICATION

This application is a continuation-in-part of U.S. patent application Ser. No. 525,971 filed Sep. 7, 1995.

BACKGROUND OF THE INVENTION

The present invention relates to a pet litter separation system for separating pet waste products from reusable pet litter granules as previously deposited in a conventional litter tray and, in particular, relates to an inexpensive separation device which is usable for separating solid waste products from the reusable granules by means of a simple procedure that minimizes the possibility of messy accidents and facilitates thorough cleaning of the litter tray and the separation device.

A basic system for removing solid waste products from reusable pet litter granules involves the process of individually picking out solid waste products from the granules using a spoon or other form of hand scoop. This procedure, however, tends to be slow and tedious, and the pet owner is exposed to bad odors for the relatively long period of time that it takes to complete this process. Moreover, it is easy for the solid pet waste products to roll off the scoop if the pet owner is distracted during the procedure, therefore making it likely that the pet owner will also have to clean up at least partially crumbled waste products that have fallen onto the surrounding floor. Furthermore, it is likely that the pet owner will fail to find and scoop up all the pet waste products so that the litter tray and its contents will not be thoroughly cleaned.

A more efficient type of separation system is shown in Larter U.S. Pat. No. 4,325,325. The Larter system uses three separate components. These include a pair of containers or trays each of which is shallow and rectangular-shaped in the manner of a conventional litter tray so as to be able to accommodate therewithin a long-bodied pet, such as a cat or dog, without taking up excessive floor space. The third component is a litter-separating device having a horizontal rim, a sloping sidewall and a bottom that is penetrated by numerous small openings. The horizontal rim of this separator device is rectangular-shaped to conform dimensionally with the mouth of each container. After using a first one of the containers in the same manner as a conventional litter tray, the pet owner begins the cleaning process by placing the separator device over the first container so that the horizontal rim of the device sealably engages the mouth of the first container. The second container is then placed in an inverted position over the separator device with its mouth likewise sealed by the horizontal rim and with its bottom forming a chamber above the openings in the separator device. Keeping a firm grip on the outer containers, the pet owner simultaneously inverts both the containers and the separator device so that the reusable litter granules can fall through the openings in the device into the second container, which has now become the bottom container, while the solid pet waste products are trapped inside the separator device and from there may be removed.

Although the Larter system is more efficient than a hand scoop for separating solid waste products from reusable litter granules, the pet owner is forced to purchase all three components in order to utilize the system since the components will not operate correctly unless they are in close dimensional conformity with each other. Not only does this increase the cost of using the system, but also the pet owner cannot adapt the system to the litter tray that the pet is already accustomed to using. Additionally, if the components are made of a lightweight material, such as plastic, for ease of handling, it is likely that after repeated uses the components will gradually bend out of shape so that they no longer fit precisely together, which process will be hastened if the pet owner thoroughly cleans the components after each use with a sanitizing hot water treatment. Furthermore, during the process of inverting both the containers and the separator device, the pet owner must exercise a high degree of skill by carefully selecting where to grip the containers and by taking care not to relax his or her grip during the inverting step so that the mouths of the components do not come apart and cause all the pet waste products to spill onto the floor. Moreover, after the containers have been inverted and the separator device is being lifted away with the solid waste trapped inside, it is then difficult to pour this waste out of the separator device and into a disposal container without spilling some of the waste off to the sides of the container and without having some of the waste products being broken up as they tumble over the small openings in the bottom of the device.

In order to reduce the number of separate components that must be handled and to eliminate the need for inverting containers, another type of litter separating system has evolved. In this alternative system, a filtering device is provided, such as an openwork basket or a perforated screen or liner, which is suitably sized to fit in a nested position within the litter box, which box is ordinarily rectangular-shaped and must be purchased with the filtering device in order to ensure dimensional conformity therewith. In this system, the filtering device is buried within the litter contained within the litter box so that after the litter box has been used and waste products have collected in the litter, the filtering device can be pulled through the litter so as to trap the waste products inside the filter. After the waste products are disposed of, generally the filter is then worked back into the litter so as to be buried again underneath the litter. Examples of systems that use a buried filter are shown, for example, in Dowling et al. U.S. Pat. No. 5,372,095, Lauretta et al. U.S. Pat. No. 5,207,772, Ouellette et al. U.S. Pat. No. 5,038,721, Prince et al. U.S. Patent No. 4,817,560, Wilson U.S. Pat. No. 4,802,442, Geddie U.S. Pat. No. 4,217,857 and Menzel U.S. Pat. No. 4,190,525.

In comparison to the Larter system, the system just described is somewhat cheaper since only two separate components need to be purchased instead of three. However, like the Larter system, the system just described cannot ordinarily be adapted to the pet owner's original litter box since, in this system, the filter and the litter box need to be in dimensional conformity with each other. Furthermore, since the reused litter never leaves the litter box, this litter box is never thoroughly cleaned and is therefore subject to permanent staining and soiling and may develop an offensive and lingering odor. Finally, the filtering element of these systems are difficult to clean, particularly around the filtering screen or lattice members that are intended to block the pet waste products.

Yet another category of litter separating device uses a closed chamber system (e.g. to keep in obnoxious odors) where the chamber can be tilted or rotated so that the reusable litter passes through a screen into a collection chamber while the larger pet waste products pass over the screen into an adjacent discharge port and, from there, into a disposal bag. These closed chamber systems, which are sometimes called pet "privies," tend to be complicated in construction and bulky since they typically include three different compartments (i.e., a step-in compartment for accommodating the pet, a collection compartment for receiving the reusable litter during screening and a disposal compartment or bag for receiving the pet waste products). Moreover, these systems can include hard-to-reach interior surfaces thereby making it difficult to thoroughly clean these devices after use. Examples of this type of system are shown, for example, in Glass U.S. Pat. No. 5,394,833 and Lapps et al. U.S. Pat. No. 5,178,099.

The types of systems that have been described above are ordinarily intended to be used with absorbent or "clumpable" type pet litter, which type of pet litter, when impregnated with urine, tends to clump together, thereby enabling the clumps to be scooped or filtered out together with the solidly-formed waste products. There are other types of systems, however, which provide not only a step-in litter box but also a chamber for separately collecting the pet urine. This type of system is shown, for example, in Kirk et al. U.S. Pat. No. 5,184,574, Vargo U.S. Pat. No. 4,649,578, Lander U.S. Pat. No. 4,444,148, Gruss U.S. Pat. No. 4,326,481, Vander Wall U.S. Pat. No. 3,332,397, Robb U.S. Pat. No. 2,971,493, Conlon U.S. Pat. No. 2,144,329, French Patent Publication No. 2,530,923 and Netherlands Patent Publication No. 8,102,536. One of these references, Gruss U.S. Pat. No. 4,326,481, further shows a related system which uses hydrophobic (e.g. urine-impregnable) litter granules which allows the urine to be collected in the same container that is being used as the step-in litter box, that is, because of the special characteristic of these granules, the urine can simply be poured out of the litter box through a filter and spout at the corner of the box without soaking into and being retained by these granules. In any event, in all of these systems, the urine is allowed to sit in a liquified state in at least some portion of the litter box for an extended period of time, which condition can cause permanent staining of the sidewalls of the litter box and promote the free growth of disease-causing or odoriferous organisms. Furthermore, in many of these systems, the litter box includes internal passages which are difficult to reach and hence impossible to clean thoroughly.

Based on the foregoing, an object of the present invention is to provide an improved separation system for separating pet waste products from reusable pet litter granules using an apparatus that can be inexpensively manufactured and that can thus be sold at low cost to consumers.

Another object of the present invention is to provide a pet litter separation system which can be easily cleaned after each use.

Another object of the present invention is to provide a pet litter separation method which facilitates thorough cleaning of the pet litter box.

Another object of the present invention is to provide a pet litter separation method which can be easily carried out by pet owners of only average dexterity.

Another object of the present invention is to provide a pet litter separation system wherein pet waste products are separated from reusable pet litter granules in such a manner that accidental release of the pet waste products onto the floor is minimized.

Another object of the present invention is to provide a pet litter separation system of durable construction that will not require frequent repair or replacement.

SUMMARY OF THE PRESENT INVENTION

A pet litter separation system and method is provided utilizing a separation device and cover. The separation device is of open-centered construction and has an upper end, lower end, a sidewall interconnecting the ends, a mouth at the upper end and a separation member covering the lower end. This member forms openings of suitable size for permitting passage of reusable pet litter granules while blocking passage of clumped waste products. These reusable granules and waste products are introduced into the device through the open mouth from a conventional litter tray in which they have been previously deposited or formed. The cover has a first portion positionable inside the device in overlying relationship to the separation member so that the reusable granules are prevented from exiting through the member and further includes a mechanism for facilitating removal of the first portion out from beneath the reusable granules and waste products so that the reusable granules are free to pass through the member. In one preferred embodiment, the cover is formed from a flat piece of flexible material, and the removal mechanism is a handle for facilitating pull-out removal of the cover.

In accordance with the foregoing system and method, only two components, the separation device and cover, are needed for recycling litter in the litter tray after use of this litter by the pet, and these components can be manufactured inexpensively and constructed for easy cleaning and durability. By completely emptying the used litter from the tray into the separation device while the separation member is covered, the tray is made accessible for thorough cleaning and sanitizing. By removing the cover after the device has been set within the tray, spillage and waste of the reusable litter granules is avoided and by further moving the device in back-and-forth sifting movement with both hands, the remainder of the reusable granules can be returned to the tray in accordance with a procedure which is easily executed by individuals of average dexterity.

In an alternative aspect of the invention, a separation device of the construction described above is provided; however, the device is supported atop the upper opening of a container before the reusable granules and clumped wasted products are poured into the device from the litter tray. The reusable granules are therefor free to pass through the separation member of the device into a cavity formed between the separation member and a closed bottom of the container.

In accordance with this second aspect, the tray can be completely emptied for thorough cleaning, waste product spillage can be avoided, and the processing procedure can be easily executed by a user of average dexterity. On the other hand, in comparison with the pull-out cover above described, the container constitutes a relatively bulky item that requires significantly more space when being placed into storage between uses.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

A. Overview

Figure 1:
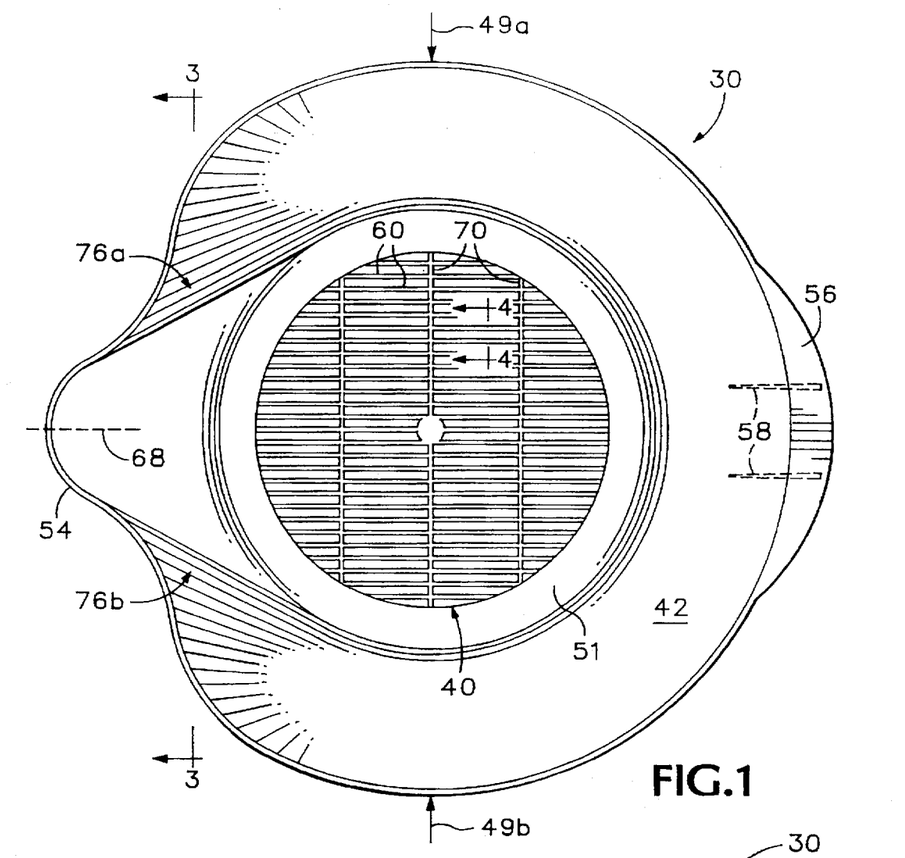
FIG. 1 is a top view of an exemplary separation device for separating pet waste products from reusable pet litter granules as constructed in accordance with the present invention.
Figure 2:
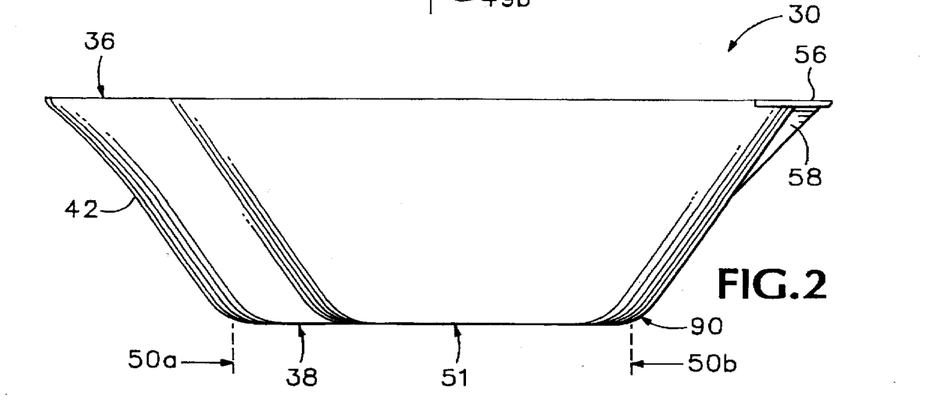
FIG. 2 is a side elevational view of the separation device of FIG. 1.

FIGS. 1 and 2 show a top and side view, respectively, of an exemplary separation device 30 for separating pet waste products from reusable pet litter granules. As shown, this device is of one-piece molded construction and is preferably formed of a strong but lightweight polymeric material, such as polyethylene of 0.01 inch nominal thickness. Since no assembly is required in the manufacture of this device, this device can be offered at inexpensive cost to the consumer. Also, because of its one-piece construction, this device is more reliable than the multicomponent systems previously used for separating pet waste products from reusable pet litter granules.

Referring to FIGS. 1-2, the exemplary separation device 30 has a wide upper end 36 forming an open mouth and, opposite this wide end, further has a narrow lower end 38 that is covered by a separation member or grate 40. The device also includes a sidewall 42 that extends between the wide and narrow ends and that is of open-centered generally frusto-conical shape.

Figure 5:
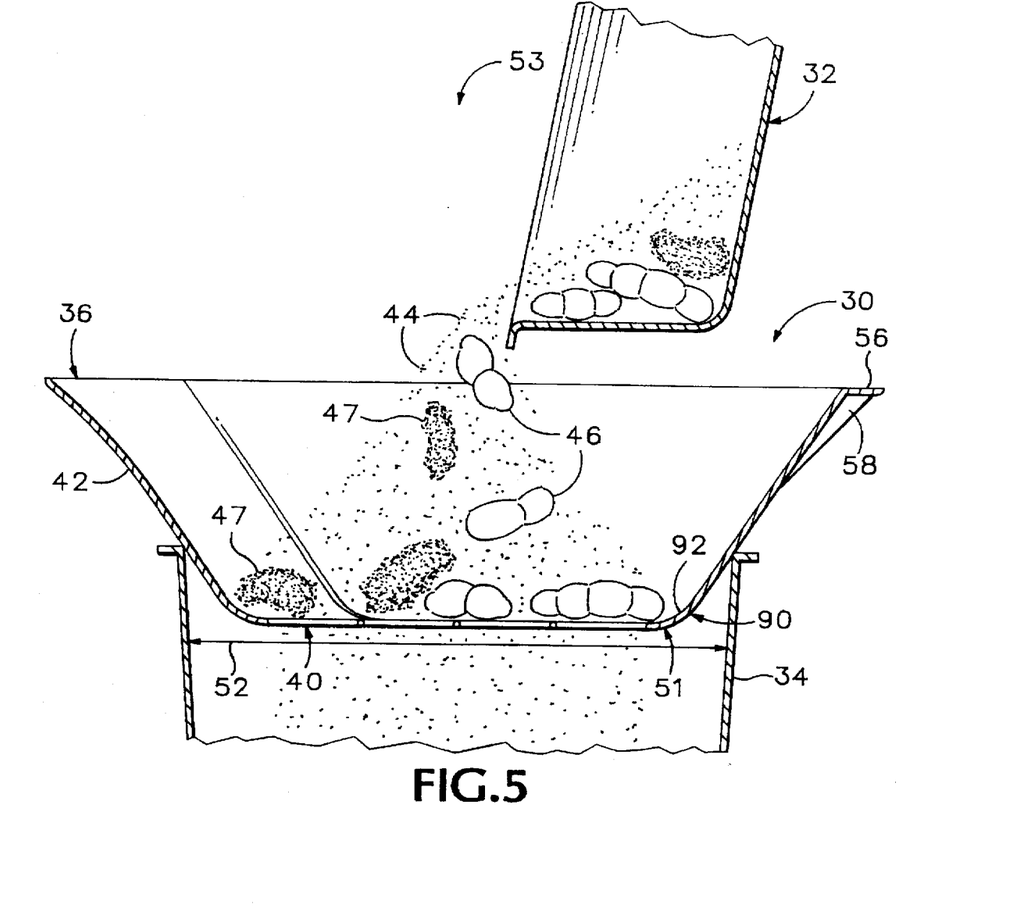
FIG. 5 shows a particular step in a first method of using the exemplary separation device of FIG. 1 whether the device, shown in side sectional view, is supported atop a bucket, shown in cutaway sectional view, and reusable pet litter granules together with pet waste products are being poured into the device from a conventional litter tray, shown in cutaway sectional view.
Figures 6, 7:
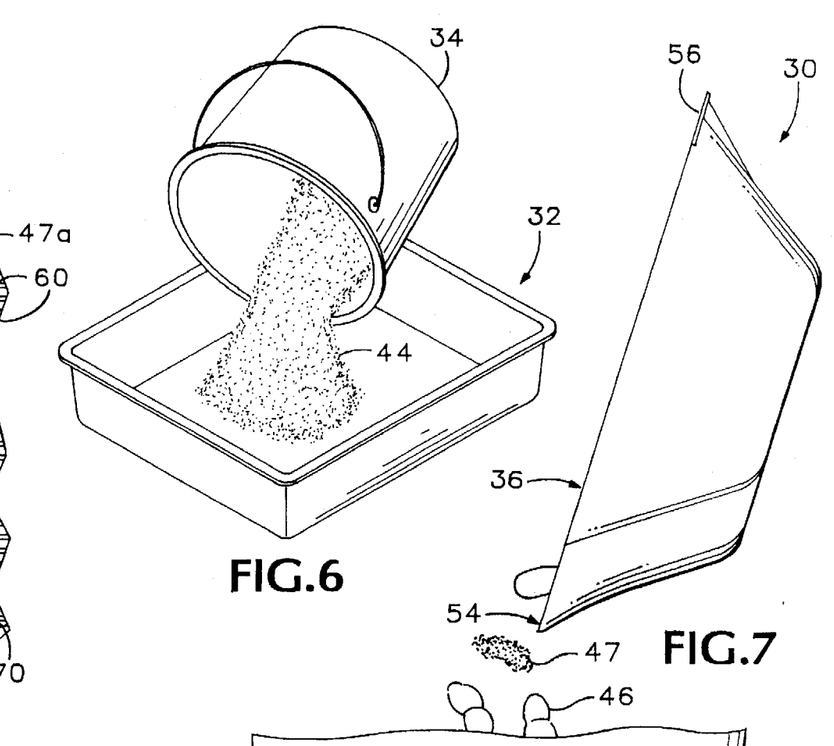
FIG. 6 is a perspective view of a subsequent step in a first method of using the present invention wherein the reusable pet litter granules received by the bucket of FIG. 5 are being poured from the bucket back into the conventional litter tray, preferably after thorough cleaning of the tray.
FIG. 7 illustrates a further step in a first method of using the present invention wherein the pet waste products trapped inside the separation device in FIG. 5 are being poured back out the wide end of this device into a waste container.

The separation device 30 is designed for use with a conventional litter tray 32 as shown in FIG. 6. The litter tray is filled with absorbent or "clumpable" type pet litter, and the pet is then permitted to use the litter tray in its customary manner. After a normal period of use, the contents of the litter tray will include reusable pet litter granules 44 that have not been soiled by the pet, solidly-formed fecal clumps 46, and nonreusable pet litter granules that have come together to form granular clumps 47 as a result of being impregnated with urine, which respective items are poured into the wide end of the device for processing as shown in FIG. 5. As indicated in FIG. 5, the separation grate 40 of the device allows the smaller reusable pet litter granules 44 to pass through the device for recycling while the larger pet waste products 46 and 47 are trapped within the device by the grate and in this manner are separated out from the reusable granules. Referring to FIG. 7, the pet waste products are poured back out of a pouring spout located at the wide end of the device into a container 48 for final disposal. By adapting the separation device for use with a conventional litter tray in the manner just described, no retraining of the pet is required but, instead, the owner can continue to use the litter tray to which the pet is already accustomed.

In the separation method shown in FIG. 5, a general-purpose container or bucket 34, such as of conventional 5 gallon size, supports the separation device 30 while the user is pouring the litter granules and pet waste from the litter tray 32 into the device. In accordance with this method, the reusable litter granules 44 pass through the separation member 40 and collect within the space or cavity formed between the member and the closed bottom of the bucket. After the litter tray has been thoroughly cleaned, the reusable litter granules are poured from the bucket back into the tray, as shown in FIG. 6, thereby completing the recycling process.

Figures 9, 13:
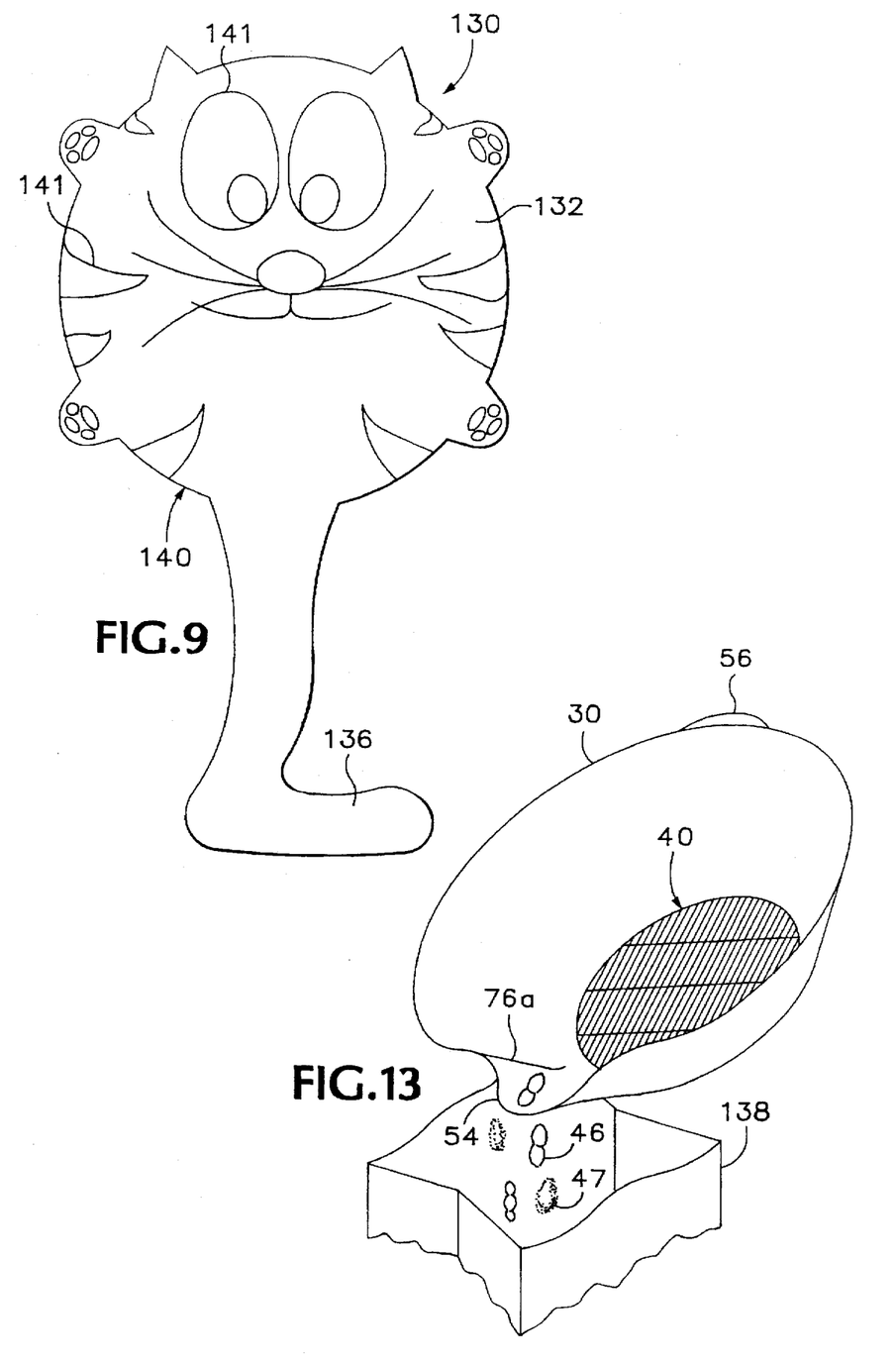
FIG. 9 is a top view of an exemplary cover used in conjunction with the separation device of FIG. 1 for separating pet waste products from reusable pet litter granules in accordance with a second exemplary method of using the device.
FIG. 13 is a perspective view showing a subsequent step in the second method involving dumping the waste product clumps from the device into a disposal bag.
Figure 10:
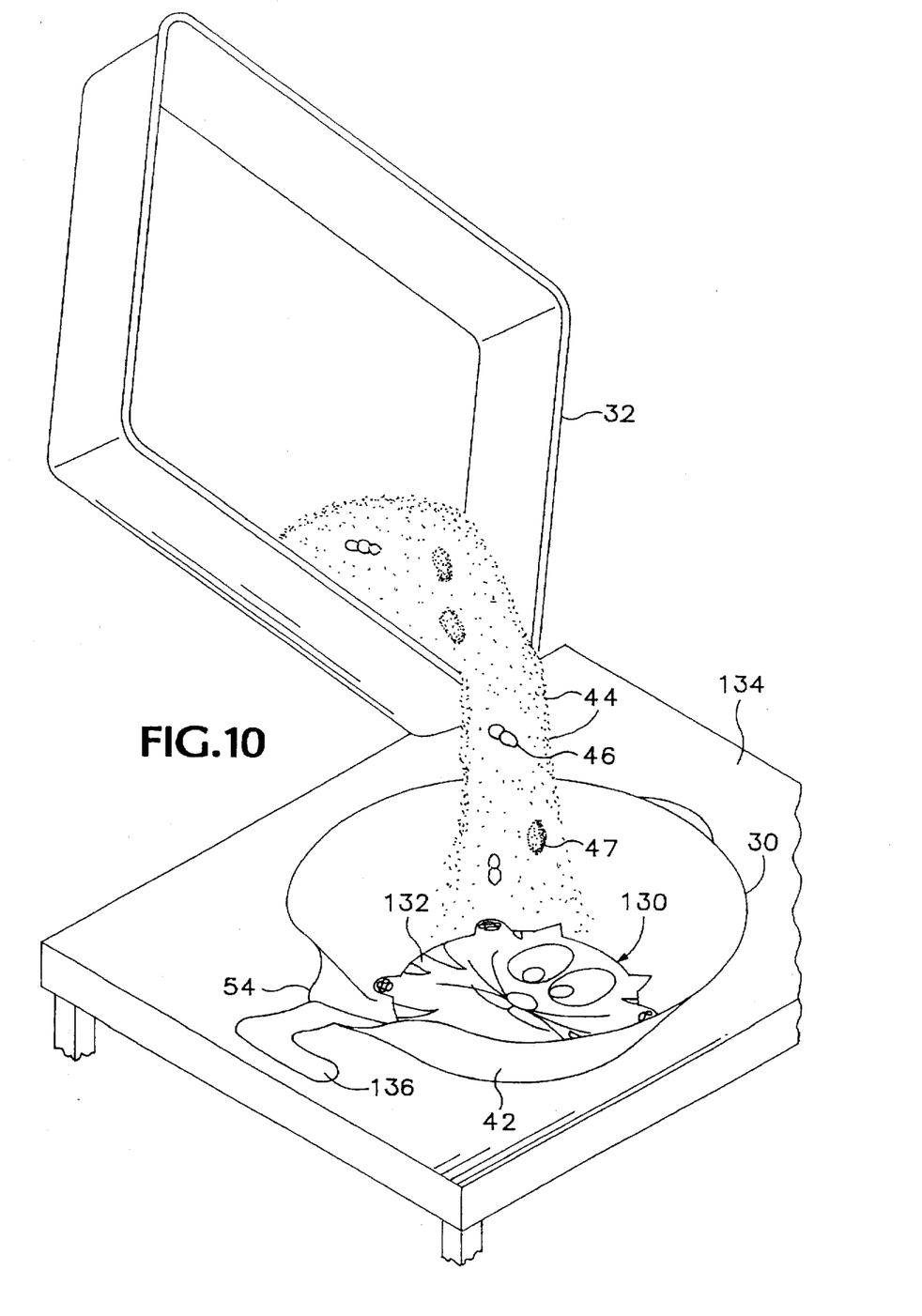
FIG. 10 is a perspective view showing how, in accordance with the second method, the cover is positioned inside the device and the used litter is poured from a conventional litter tray into the device.
Figure 11:
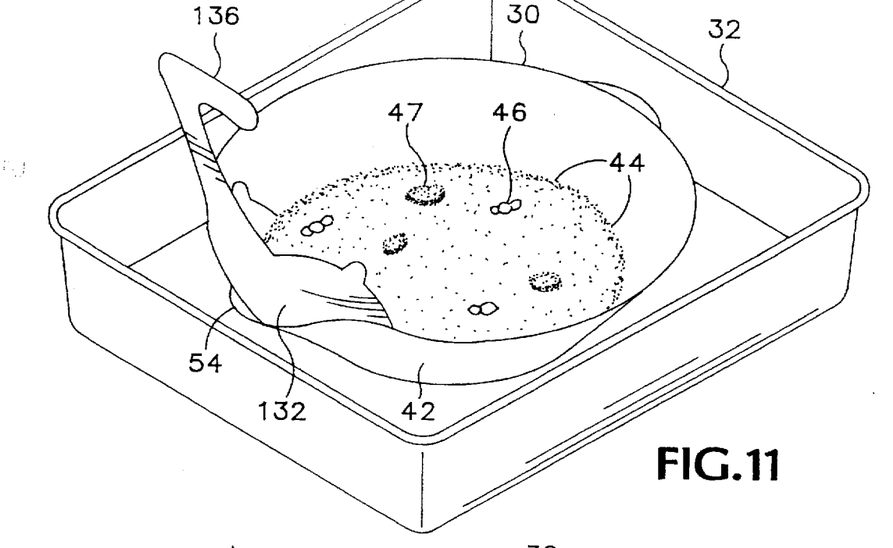
FIG. 11 is a perspective view showing a subsequent step in the second method involving positioning the litter tray beneath the device and removing the cover.
Figure 12:
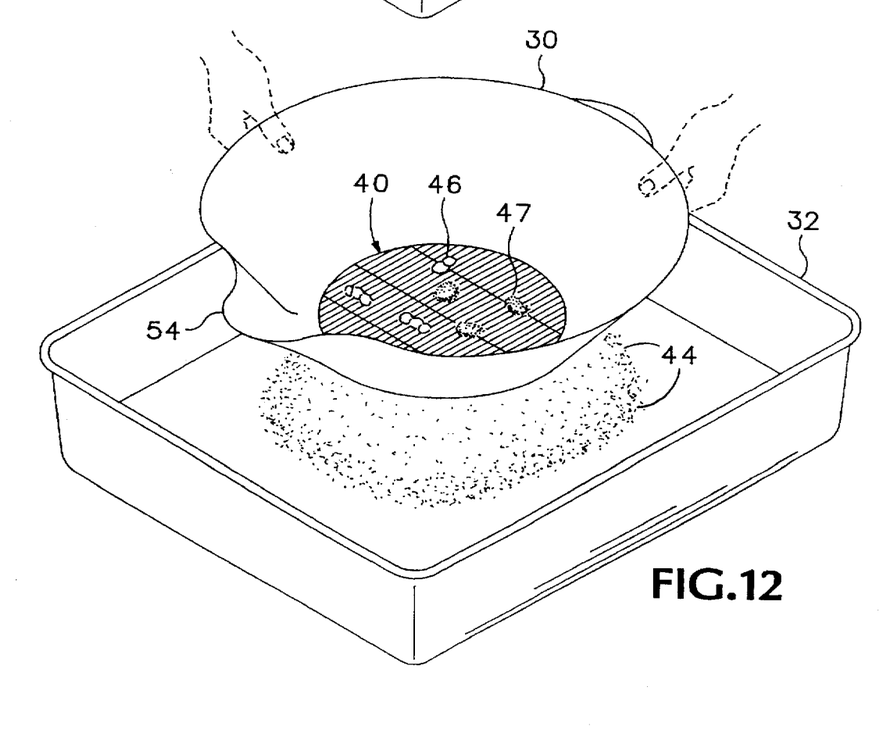
FIG. 12 is a perspective view showing a subsequent step in the second method involving back-and-forth sifting of the device to ensure that the reusable litter granules all pass back into the litter tray.

An exemplary alternative separation method that does not require providing and storing a bucket is shown in FIGS. 10-13. In accordance with this method, a pull-out cover 130 is provided having a first portion 132 that fits within the separation device 30 so as to cover the separation member or grate 40 as shown in FIG. 10. As before, the litter granules and pet waste products are poured into the device from the litter tray 32; however, the cover prevents the reusable litter granules from passing through the separation grate thereby enabling the device to be supported on any available flat surface 134 as the tray is being emptied. After the tray has been thoroughly cleaned, the separation device is placed inside it, as shown in FIG. 11, and the cover is removed by means of a removal mechanism or handle 136. A back-and-forth sifting movement is then applied to the separation device, as shown in FIG. 12, causing the reusable litter granules 44 to fall back into the litter tray so as to complete the recycling process. The fecal clumps 46 and granular clumps 47 which are trapped by the separation grate are poured back out the open end of the device into a disposal container 138 as shown in FIG. 13.

For ease of description, specific features of the separation device 30 will hereinafter be discussed in connection with the processing method first described which uses a general purpose container or bucket 34 for intermediate holding of the reusable litter granules. The second processing method which uses the pull-out cover 130 will then be described in detail. It will be recognized that at some stage during each of these processes, the litter tray is completely emptied of its contents. Thus, the litter tray is able to be thoroughly cleaned by running it through, for example, a sterilizing hot wash, before the reusable litter granules are returned to the tray. This approach provides enhanced sanitation in comparison to those systems where the litter tray is never completely emptied of its contents which eventually can cause the tray to become permeated with harmful microorganisms and a bad odor.

B. Separation Device and First Processing Method

As noted above, the sidewall 42 of the separation device 30 is of generally frusto-conical shape. With respect to the preferred embodiment depicted in FIG. 1, the diameter of the device at its wide end 36 as measured between outer edges 49a–b is nominally 15.25 inches across. Referring also to FIG. 2, at its narrow end 38, the diameter of the device as measured between the points 50a–b where the tangents of its base portion 51 and sloping sidewall intersect is nominally nine inches across. Thus, referring to FIG. 5, the device can be supported atop the upper mouth of a bucket 34 provided the inner diameter 52 of the bucket is within a range of about 10 to 15 inches across as is ordinarily the case for a standard-sized five-gallon bucket. The frusto-conical shape of the sidewall 42 also enables the device to sit atop the bucket in a close-fitting relationship thereto thereby minimizing the amount of particle dust that will billow up from around the sides of the bucket when the contents of the litter tray 32 are emptied into the device during the waste-separating step depicted in FIG. 5.

It will be noted that close dimensional conformity between the litter tray 32 and the separation device 30 is not required and that the device 30 will perform its separating function whether the litter tray is of average size (13×19 inches) or of one of the other larger or smaller sizes also available. During the waste-separating step depicted in FIG. 5, the wide mouth 36 of the separation device 30 ensures that all the contents of the litter tray 32 will empty into the device as the pet owner tilts the litter tray in the direction 53 indicated. In accordance with conventional design, the tray will normally be rectangular-shaped and will thus have a corner from which the contents of the tray can be conveniently poured during this step. On the other hand, being of generally frusto-conical shape, the sidewall of the separation device is completely free of corners which feature, in accordance with the present invention, eliminates hard-to-clean areas on the sidewall where, for example, smearing of the pet waste products cannot easily be wiped clean. To control the direction of the waste clumps 46 and 47 as they are being poured back out the wide end of the device in the waste-disposing step depicted in FIGS. 7 and 8, the device is provided with a pouring spout 54.

As noted above, during the waste-separating step in FIG. 5, the litter tray 32 is tilted relative to the device 30 in the direction 55 indicated preferably until its contents are fully emptied into the device. Because the separation device and the litter tray are not fixedly coupled to each other, the angular relationship between the upper opening 56 of the tray and the open mouth 36 of the device can be varied during this procedure. This is preferable to the approach used in mechanically coupled or manually clamped systems where both the waste-collection tray and the separation unit are simultaneously turned together so that either an oversized external pivot is needed to simultaneously support these devices or the pet owner must exercise more than average dexterity as he or she balances both the tray and the separation unit while the weight of each is changing. In the system of the present invention, in contrast, the pet owner is only required to balance the litter tray while pouring out the waste products and reusable granules into the separation device. In the processing method shown in FIG. 5, in particular, the device is separately supported atop the upper opening of the bucket 34 so as to form a cavity between the separation member 40 and the closed bottom of the bucket of sufficient size to receive the reusable pet litter granules.

Referring to FIG. 1, a horizontally extending rim 56 forming a handgrip is provided on the separation device 30 diametrically opposite the spout so as to facilitate handling of the device during the waste-disposing step depicted in FIG. 7. Referring also to FIG. 2, this rim or handgrip is buttressed by a pair of vertical flanges 58.

Figure 4:
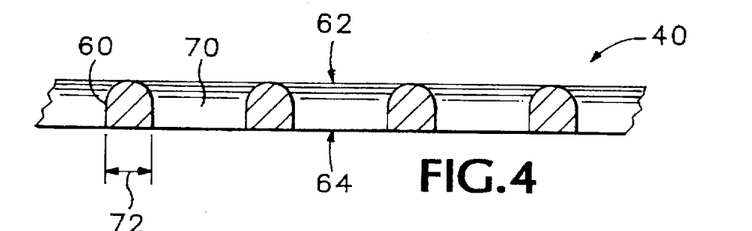
FIG. 4 is a sectional view taken along lines 4—4 in FIG. 1.

Referring to FIGS. 1 and 4 together, the separation member or grate 40 of the exemplary device 30 includes an interior surface 62, an exterior surface 64 and a plurality of parallel ribs 66. As shown, these ribs form elongate slots and extend parallel to the spout 54, that is, they extend parallel to an imaginary center-line 68 bisecting the spout. This parallel series of ribs is joined together and reinforced by a smaller series of cross ribs 70, where the spacing between the cross ribs is relatively large in comparison to the spacing between the larger series of parallel ribs. With respect to the exemplary device shown in FIG. 1, for example, the edge-to-edge spacing between the cross ribs is nominally about 1.83 inches while the edge-to-edge spacing between the larger series of parallel ribs is nominally about 0.188 inches. Referring to FIG. 4, the width 72 of each rib at its widest extent is nominally about 0.09 inches.

Figure 8:
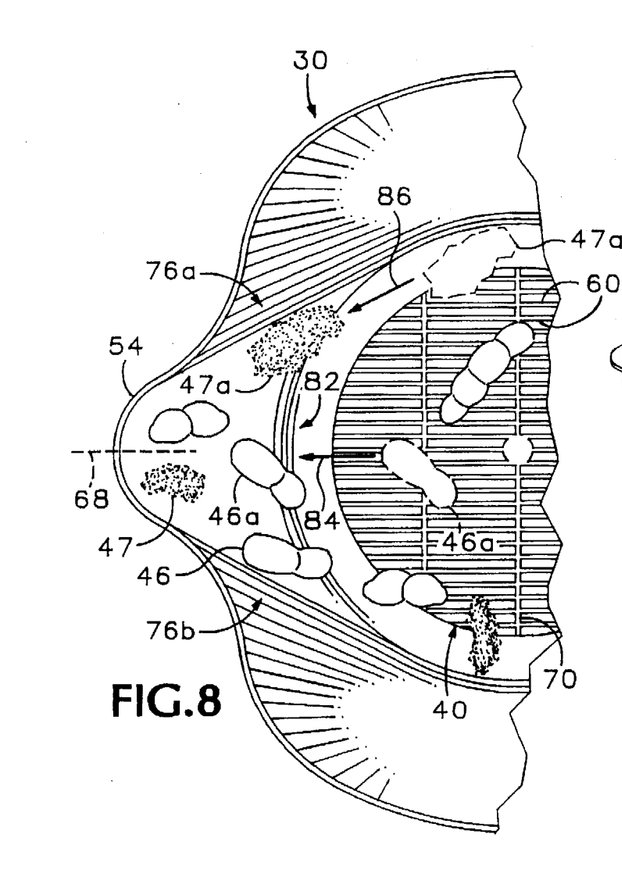
FIG. 8 is a top view indicating how the pet waste products, including the solidly-formed fecal clumps and the urine-impregnated granular clumps, are guided by the inside contours of the exemplary separation device during the pouring step shown in FIG. 7 so as to prevent accidental spillage or breakup of these waste products.

FIGS. 7 and 8 indicate the movement of the individual waste product clumps 46 and 47 as they are being emptied from the device 30 into the disposal container 48. As these figures suggest, most if not all of the clumps will travel across the separation grate 40 before passing along the sidewall 42 and out the spout 54. Because the separation grate includes relatively few cross ribs 70 and because the larger series of ribs 60 extend parallel to the spout, these clumps will cross relatively few ribs as they travel across the grate. Hence, the number of encounters that could result in the tumbling and the breaking up of the waste product clumps is minimized so that the pet owner can perform the waste-disposing step depicted in FIG. 7 without being overly concerned about the release of smaller waste pieces through the grate.

It will be noted that the urine-impregnated granular clumps 47 are particularly susceptible to disintegration into smaller pieces since the individual granules that form these clumps are held together only loosely. As indicated in FIG. 4, in order to further reduce the possibility of clump breakup, the cross ribs 70 and the larger series of parallel ribs 66 are formed so as to have a rounded shape along the interior surface 62 of the separation grate 40. Thus, the interior surface of the grate is free of any sharp edges that could crease or snag the individual clumps and cause these clumps to break apart.

Figure 3:
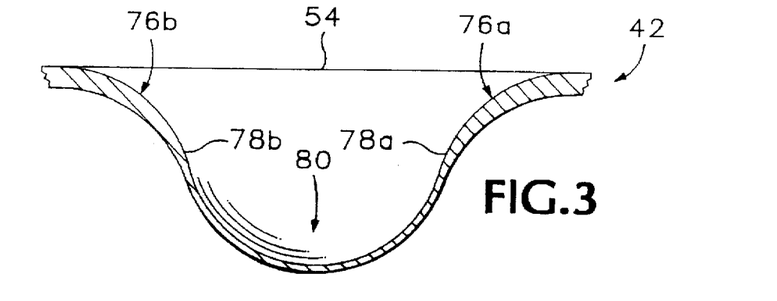
FIG. 3 is a sectional view taken along lines 3—3 in FIG. 1.

In accordance with the present invention, the exemplary separation device 30 includes yet another feature designed to prevent the accidental release of pet waste products onto the floor. In particular, the side-wall 42 of the device 30 includes a pair of protuberances or humps 76a and 76b that are located adjacent the spout 54 as shown in FIG. 8. Referring also to FIG. 3, which shows a sectional view through the protuberances, these protuberances each include a side, 78a or 78b, that extends opposite the other protuberance, and these sides form a channel 80 that converges toward the spout as indicated in FIGS. 3 and 8 together. Accordingly, when the device is tilted toward its spout in order to empty the pet waste products into the disposal container 48 during the waste-disposing step of FIG. 7, the individual waste product clumps 46 and 47 are forced to exit the device at the spout and are not permitted, for example, to exit the device on one or the other side of the spout since their travel along this direction is blocked by one or the other protuberance. Thus, the pet owner can easily direct the flow of waste products so that these products pass into the disposal container instead of spilling onto the floor.

Referring to FIGS. 1 and 3 together, the sides 78a and 78b of the channel 80 formed by the protuberances 76a and 76b diverge toward the separation grate 40 so as to form an entryway adjacent the grate. Referring also to FIGS. 7 and 8, this entryway is made sufficiently broad to collect any pet waste products that leave the grate during the waste-disposing step shown. Thus, in FIG. 8, as the device is tilted toward its spout 54, the granular clump 47a initially moves in a direction parallel to the imaginary centerline 68 of the spout, that is, it initially moves in the same direction 84 as fecal clump 46a. However, the entryway of the channel 80 is wide enough to intersect the path of any clump that moves in this direction from a position on the grate. Accordingly, clump 47a will enter the channel and be redirected by the sides of the channel toward the spout along the direction 86 shown. In this manner, all the pet waste products 46 and 47 that were initially trapped within the device are funneled toward the spout just before being poured into the disposal container 48, and the pet owner does not need to shake or strike the device during this step in order to dislodge any loose clumps.

Preferably, the container 48 used for final disposal of the waste products is formed from a biodegradable material. This enables the pet waste products to be disposed of in an environmentally-friendly manner and, more specifically, allows the waste products to release their nutrients, such as nitrogen, back into the soil after the container has rapidly decomposed at the disposal site.

An important advantage of the separation device 30 of the present invention is the manner in which it can be easily cleaned after each use. The device is designed so that its entire interior surface is free of any hard-to-clean sharp edges or corners where waste product matter might collect. Thus, the sidewall 42 of the device, as noted above, has a generally frusto-conical shape and lacks any sharp edges along its interior surface, including that portion adjacent the spout. Viewing FIGS. 1 and 3 together, for example, it will be noted that the channel 80 formed by the pair of protuberances 76a and 76b is free of any sharp edges as is the channel formed by the spout 54 itself. Referring to FIGS. 1 and 4 together, it will also be noted that the ribs 66 and 70 which form the separation grate 40 are of rounded shape along the interior surface 62 of such grate. Furthermore, referring to FIGS. 1 and 5 together, it will be noted that the base portion 51 and sidewall 42 of the device connect together along a corner portion 90, which corner portion has an interior surface 92 that is of rounded shape along its entire extent. In accordance with these features, the pet owner can easily clean the device after each use, either by running the device through a hot sterilizing wash or by wiping the device clean with an antiseptic tissue or cloth, without needing to be concerned that there is any waste matter lodged in some inaccessible edge or corner within the device. It will also be noted that any slight deformation of the device that may occur while it is being cleaned, such as in a sanitizing hot wash, will have negligible effect on the capacity of the device to perform its intended function.

C. Second Processing Method

FIG. 9 shows a pull-out cover 130 that is adapted to be used with the above-described separation device 30 for recycling reusable litter granules from a litter tray in accordance with a second exemplary processing method. An overview of this method is described under the first subsection heading of this Detailed Description portion. The use of the cover eliminates any need for the owner to keep a relatively bulky container or bucket on hand as was required with the first processing method.

As FIG. 9 indicates, the pull-out cover 130 is formed from a thin, flat piece of material. This material is preferably flexible and, in addition, is preferably impermeable to fluids. The particular cover depicted is formed from 18 ounce polyvinylchloride (PVC)-coated polyester fabric of 25 mil nominal thickness as distributed, for example, by Supertex Fabrics of Torrance, Calif., although other materials, such as PVC-coated nylon fabric or rubber sheeting, may be used.

Referring also to FIG. 10, the cover includes a first portion 132 that is adapted to fit within the separation device 30 along the base portion of the device so as to fully cover the separation member or grate 40 (FIG. 13). Integrally joined to this first portion is a removal mechanism or handle 136. When the waste product clumps 46 and 47 and reusable litter granules 44 are poured into the device from the litter tray 32, as shown in FIG. 10, the first portion blocks these filterable materials so that they cannot pass through the separation member. The handle is of sufficient length to protrude from the filterable material after this material has been fully emptied from the litter tray into the device thereby facilitating eventual removal of the cover. If the handle is of flexible material, as shown, this handle can be draped over the sidewall 42 of the device so that it remains in an out-of-the-way position wherein it avoids unsanitary contact with the pet waste products while the device is being loaded. In the embodiment depicted, the first portion and handle are attractively formed in the shape of a cat's face and tail, respectively.

In the embodiment of the cover 130 shown in FIG. 9, a colored pattern 140 that includes markings 141 suggesting selected details of a cat's face is provided on the upper face of the cover 130, which pattern is applied to this face by a silk-screening process. Alternatively, an adhesively-backed decal of smooth, glossy paper having the pattern printed on it can be removably applied to the upper face.

Referring to FIG. 10, in accordance with the exemplary second process for recycling pet litter, the separation device is first placed on any available flat surface 134, such as a tabletop, and the exemplary cover 130 is positioned within the device so that its first portion covers the separation member 40 and so that its handle 136 is draped across the sidewall 42 of the device in a position centered directly over the device's pouring spout 54. The filterable material, which includes the waste product clumps 46 and 47 and the reusable litter granules 44, is then poured into the device from the litter tray 32 until the tray has been completely emptied. It will be recognized that the nonabsorbent properties of the fluid-impermeable cover enables the cover to sit for a time underneath the filterable material without undesirably absorbing waste fluids from this material, thereby affording the pet owner ample opportunity to thoroughly clean and sanitize the litter tray in preparation for the next step.

Referring to FIG. 11, the next step in the exemplary second process involves placing the litter tray 32 beneath the separation device 30 so that the device sits within the tray and then gently pulling on the removal mechanism or handle 136 so that the first portion 132 passes over the spout 54 and slides out from beneath the filterable material. Since the tray is positioned beneath the device, any reusable litter granules that pass through the separation member 40 (FIG. 13) during this step will collect back inside the litter tray thereby minimizing material waste and cleanup time. It will be noted that because of the flexibility of the first portion, the first portion generally conforms to the upwardly angled shape of the sidewalls 42 as it begins to pull away from the separation member thereby prevent spillage of filterable material even when this material nearly fills the separation device. It will further be noted that because the first portion is pulled out over the spout, this flexible portion generally conforms to the shape of the spout as it approaches the top end of the device, that is, the first portion assumes the shape of a sloping channel. This channel desirably guides the filterable material back down into the device as the cover is being pulled out.

Referring to FIG. 12, after the cover 130 has been removed from the separation device 30, the device is lifted with both hands and a gentle back-and-forth sifting motion is applied so that the remainder of the reusable litter granules 44 pass through the separation member 40 back into the litter tray 32 while the solidly formed fecal clumps 46 and urine-impregnated granular clumps 47 are blocked by the member and hence are retained inside the device. The final steps in this processing method involve dumping these waste product clumps back out through the open mouth of the device into a disposal container 138, as shown in FIG. 13, and then cleaning and sanitizing the device and cover in preparation for their subsequent reuse.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A pet litter separation system comprising:
   (a) a separation device of open-centered construction having an upper end, a lower end and a sidewall interconnecting said ends, said upper end forming an open mouth for receiving filterable material from a litter tray including reusable pet litter granules and clumped waste products, said lower end defining a separation member forming openings of suitable size for permitting passage of said reusable pet litter granules while blocking passage of said clumped waste products; and
   (b) an independently movable cover, unattached to said separation device, said cover having a first flexible portion positionable inside said device in overlying relationship to said separation member so that when said filterable material is deposited into said device from said tray, said reusable pet litter granules are prevented by said first flexible portion from exiting through said separation member, said cover including means for facilitating removal of said first flexible portion out from beneath said filterable material in such a manner that said first flexible portion substantially conforms to the contour of said separation member and a portion of said sidewall adjacent said separation member as said first flexible portion is removed from beneath said filterable material, so that said reusable pet litter granules are free to pass though said separation member.

2. The system of claim 1 wherein said removing means comprises a handle.

3. The system of claim 1 wherein said handle is of sufficient length to protrude from said filterable material when said filterable material is deposited into said device.

4. The system of claim 1 wherein said first portion is of flexible material.

5. The system of claim 4 wherein said open mouth has a spout.

6. The system of claim 1 wherein said first portion is constructed of a flat sheet of material.

7. The system of claim 1 wherein said removing means comprises a flexible handle.

8. The system of claim 1 wherein said first portion is formed of fluid-impermeable material.

9. A pet litter separation method comprising:
   (a) providing a separation device of open-centered construction having an upper end, a lower end and a sidewall interconnecting said ends, said upper end forming an open mouth for receiving filterable material from a litter tray including reusable pet litter granules and clumped waste products, said lower end defining a separation member forming openings of suitable size for permitting passage of said reusable pet litter granules while blocking passage of said clumped waste products;
   (b) providing an independently movable cover, unattached to said separation device, said cover having a first flexible portion that includes a surface;
   (c) positioning said first flexible portion inside said device in overlying relationship to said separation member depositing said filterable material into said device from said tray in such a manner that said filterable material is in direct contact with substantially all of said surface of said first portion, said reusable pet litter granules being prevented by said first flexible portion from exiting through said separation member; and
   (d) thereafter removing said first flexible portion out from beneath said filterable material in such a manner that a portion of said first flexible portion substantially conforms to the contour of said separation member and a portion of said sidewall adjacent said separation member while said first flexible portion is being removed out from beneath said filterable material so that said reusable pet litter granules are free thereafter to pass through said separation member.

10. The method of claim 9 including cleaning said tray after depositing said filterable material into said device and, after removing said first portion, passing said reusable pet litter granules through said separation member directly back into said tray.

11. The method of claim 9 including removing said first portion while said separation device is within said tray.

12. The method of claim 9 including providing a flexible first portion and removing said first portion so that said first portion conforms in shape to said sidewall while being removed.

13. The method of claim 12 including providing said open mouth with a spout and removing said first portion so that said first portion conforms in shape to said spout while being removed.

14. The method of claim 9 including providing a flexible handle for removing said first portion and keeping said flexible handle draped outside said device while depositing said filterable material into said device to avoid contact between said filterable material and said handle.

15. The method of claim 9 including, after passing said reusable pet litter granules through said separation member, emptying said clumped waste products through said open mouth into a disposal unit and cleaning said separation device and cover for reuse.

* * * * *